US010040637B2

(12) United States Patent
Geertsen

(10) Patent No.: US 10,040,637 B2
(45) Date of Patent: Aug. 7, 2018

(54) OSCILLATORY FEEDER

(71) Applicant: REC Silicon Inc, Moses Lake, WA (US)

(72) Inventor: Robert J. Geertsen, Eltopia, WA (US)

(73) Assignee: REC Silicon Inc, Moses Lake, WA (US)

( * ) Notice: Subject to any disclaimer, the term of this patent is extended or adjusted under 35 U.S.C. 154(b) by 0 days.

(21) Appl. No.: 15/333,652

(22) Filed: Oct. 25, 2016

(65) Prior Publication Data

US 2018/0111764 A1    Apr. 26, 2018

(51) Int. Cl.
*B65G 11/08* (2006.01)
*B65G 11/10* (2006.01)
*B65G 11/20* (2006.01)
*B65G 47/20* (2006.01)
*B65G 25/02* (2006.01)

(52) U.S. Cl.
CPC ........ *B65G 25/02* (2013.01); *B65G 2201/042* (2013.01); *B65G 2812/0384* (2013.01)

(58) Field of Classification Search
CPC ... B65G 11/085; B65G 11/106; B65G 11/206; B65G 47/1421
USPC .......... 198/525, 526, 533, 617; 193/2 B, 16, 193/25 R, 25 S, 25 C
See application file for complete search history.

(56) References Cited

U.S. PATENT DOCUMENTS

| | | | | |
|---|---|---|---|---|
| 4,194,611 A | * | 3/1980 | Mukhin | B06B 1/183 193/2 B |
| 4,274,527 A | * | 6/1981 | Baker | B65G 69/0441 193/2 B |
| 4,446,992 A | * | 5/1984 | Suzuki | B65G 11/203 193/2 B |
| 4,821,782 A | * | 4/1989 | Hyer | B65B 37/00 141/255 |
| 4,940,850 A | * | 7/1990 | Satake | B07C 5/3416 209/580 |

(Continued)

FOREIGN PATENT DOCUMENTS

| | | |
|---|---|---|
| GB | 797609 A | 7/1958 |
| WO | WO2010/019129 | 2/2010 |
| WO | WO2017/162414 | 9/2017 |

OTHER PUBLICATIONS

Anonymous, "Use of an elbow valve for effective transport of silicon," *Research Disclosure*, 2 pages (Aug. 2005).

(Continued)

*Primary Examiner* — Douglas A Hess
(74) *Attorney, Agent, or Firm* — Klarquist Sparkman, LLP

(57) ABSTRACT

An oscillatory feeder operable to convey a flowable solid material has a tubular body and a displaceable body segment. The tubular body has at least one first end, at least one second end opposite the first end and a displaceable body segment between the first and second ends. The displaceable body segment has a first fixable location positionable at a first fixed location and a second fixable location positionable at a second fixed location. The actuator is attached to the displaceable body segment and controllable to cause selected displacement of the body segment and attached actuator and corresponding selected flow of solid material within the displaceable body segment in a feed direction extending generally from the first end to the second end.

24 Claims, 19 Drawing Sheets

(56) References Cited

U.S. PATENT DOCUMENTS

| | | | | |
|---|---|---|---|---|
| 4,972,970 | A * | 11/1990 | Toerner | B65G 65/44 193/2 B |
| 5,149,229 | A | 9/1992 | Gericke et al. | |
| 5,791,493 | A | 8/1998 | Meyer | |
| 5,829,597 | A * | 11/1998 | Bielagus | B07B 1/12 209/29 |
| 5,885,625 | A | 3/1999 | Beane et al. | |
| 6,354,423 | B1 * | 3/2002 | Exner | B65G 47/72 193/14 |
| 6,375,011 | B1 | 4/2002 | Flottmann et al. | |
| 6,455,982 | B1 | 9/2002 | Hashimoto | |
| 6,622,849 | B1 * | 9/2003 | Sperling | B65D 90/623 198/532 |
| 6,651,801 | B1 * | 11/2003 | Heckendorf | B65G 47/44 198/406 |
| 6,708,851 | B2 * | 3/2004 | DaSilva | B65D 88/66 222/200 |
| 8,640,847 | B2 * | 2/2014 | Nishitsuji | B65G 11/20 193/2 B |
| 8,800,751 | B2 * | 8/2014 | Beckmann | B65G 11/203 198/550.4 |
| 8,807,315 | B2 * | 8/2014 | Marchesini | B65D 88/66 193/2 A |
| 8,939,277 | B2 | 1/2015 | Baumann et al. | |
| 8,978,268 | B2 * | 3/2015 | Itou | F26B 5/065 34/164 |
| 9,296,568 | B2 * | 3/2016 | Peterson | A01C 15/06 |
| 9,340,375 | B2 * | 5/2016 | Gualtieri | A61F 13/15617 |
| 9,493,300 | B2 * | 11/2016 | Eversole | B25D 11/106 |
| 2009/0078029 | A1 | 3/2009 | Matsusaka et al. | |
| 2013/0199663 | A1 | 8/2013 | Newbold et al. | |
| 2014/0023578 | A1 | 1/2014 | Geertsen | |
| 2016/0207701 | A1 | 7/2016 | Ernest, Jr. et al. | |

OTHER PUBLICATIONS

Sánchez, I. et al., "Vertical granular transport in a vibrated U-tube," *Traffic and Granular Flow '07*, Chapter 59, pp. 545-554 (2009).

Schertz, C. E., "Motion of Granular Material on an Oscillating Conveyor," Iowa State University, Retrospective Theses and Dissertations (1962).

International Search Report and Written Opinion for PCT-US2017-057448, dated Feb. 6, 2018.

\* cited by examiner

| Motor Speed % | frequency (hz) | RPM | Force Amplitude (Newtons) | Feed Rate (g/sec) |
|---|---|---|---|---|
| 100 | 3.75 | 225.0 | 23.35 | 942.0 |
| 90 | 3.20 | 191.7 | 16.69 | 764.0 |
| 80 | 2.87 | 171.9 | 13.62 | 712.0 |
| 70 | 2.61 | 156.5 | 11.74 | 169.0 |
| 60 | 2.34 | 140.1 | 10.00 | 27.0 |
| 50 | 2.00 | 120.0 | 6.83 | 12.1 |
| 40 | 1.59 | 95.1 | 4.35 | 1.9 |
| 30 | 1.08 | 64.7 | 2.10 | 0.2 |

Fig. 16

OSCILLATORY FEEDER

BACKGROUND

Silicon of ultra-high purity is used extensively in the electronics and photovoltaic industries. High purity granular polysilicon materials with only trace of amounts of contamination measured at the part per billion levels are often required. Producing such materials is possible, but then extreme care must be taken in any handling, packaging or transportation operations to avoid subsequent contamination.

Conventional feeding technology used to convey granular polysilicon materials includes components having metal in their construction (e.g., valves, conduits, etc.). When protective coatings or linings are compromised, or when wear occurs at the interfaces of moving parts, for example, contamination of metal parts can occur, which is unacceptable.

In addition, conventional feeders may not provide sufficient control over the rate of flow granular polysilicon and/or the flow rate range. Conventional vibrating tray feeders may achieve a feed rate range between a lowest controllable feed rate and a highest controllable feed rate of only about 1:50, but a much higher feed rate range is desirable. Other conventional approaches allow higher feed rate ranges to be achieved, but only with apparatus having multiple parts within the control volume of the flowing material that must move relative to each other, such as auger screws, rotary vanes and other similar structures. Multiple parts in relative motion within the control volume, however, leads to a greater risk of contamination.

Also, such conventional feeders are difficult to purge with a suitable process gas and/or clean in part because of their complicated constructions. The multi-piece constructions typically require an extensive use of seals to prevent leakage through components that move relative to each other.

Conventional vibratory solids conveyors typically have a rigid container constrained by linkages and/or springs that can be driven by an eccentric weight assembly coupled to an electric motor or an electromagnetic drive in a desired motion, such as elliptical rotation that includes horizontal and vertical components.

Conventional approaches to conveying solids, including vibratory conveyors, screw augers, belt conveyors and other similar devices, are not capable of achieving high performance over a large range of flows while ensuring that ultrahigh purity is maintained.

SUMMARY

Described below are apparatus and methods that address some of the drawbacks in conventional approaches to feeding flowable solids materials, including granular polysilicon.

According to a first implementation, an oscillatory feeder comprises a tubular body and an actuator. The tubular body has a first end, a second end opposite the first end and a displaceable body segment between the first and second ends. The displaceable body segment has a first fixable location positionable at a first fixed location and a second fixable location positionable at a second fixed location. The actuator is attached to the displaceable body segment and controllable to cause selected displacement of the body segment and attached actuator to feed material in the body along a feed path extending from the first end to the second end.

In one implementation, the first fixable location of the displaceable body segment is positionable at a first elevation, and the second fixable location of the displaceable body segment is positionable at a second elevation lower than the first elevation. The first fixable location can be offset in a horizontal direction from the second fixable location.

In one implementation, the displaceable body segment has a curved profile with a length longer than a shortest distance separating the first fixable location and the second fixable location, and the actuator is attached to the displaceable body segment approximately at an inflection point for a curve of the curved profile.

In one implementation, the first end comprises an end segment positionable in a generally upright orientation. Similarly, the second end can comprise an end segment positionable in a generally upright orientation.

In one implementation, the actuator comprises a rotating offset mass, and the rotating offset mass generates a force causing displacement of the displaceable body segment and the attached acutator. The displacement can be selected to cause the actuator to move in a closed trajectory having a vertical component and a horizontal component.

In one implementation, the feeder can be configured to feed granular material, and the displaceable body segment can comprise a repose section configured to collect a portion of the granular material when the displaceable body segment is at rest. The repose section can be configured to collect material of a leading edge of a flow of material received at the first end of the feeder.

In one implementation, the displaceable body segment comprises an intermediate section configured for positioning at a slight angle relative to horizontal. The intermediate section can be downstream of a first upright section and upstream of a second upright section, the first and second upright sections each extending in a generally vertical direction.

In one implementation, the tubular body is constructed of a resilient material. The tubular body can be comprised of polyurethane hose material.

In one implementation, an oscillatory feeder comprises a tubular body and an actuator. The tubular body has an inlet end, an outlet end opposite the inlet end and a displaceable body segment along a feeding direction between the inlet end and the outlet end. The inlet end is configured for connection to a source of material to be fed by the feeder. The outlet end is configured to convey material from the feeder to a location downstream of the feeder and for positioning at a lower height than and horizontally offset from the inlet end. The displaceable body segment is positionable when installed to have a length longer than a shortest distance between the inlet end and the outlet end and to define a curved profile with at least one inflection point. When installed, the displaceable body segment defines a repose section configured to support material in the displaceable body segment at an angle of repose of the material and to reduce movement of material in the feeding direction when the displaceable body segment is at rest. The actuator is connected to the displaceable body segment and has an offset rotating mass, the actuator being controllable to displace the displaceable body segment in an oscillating cycle, the cycle including movement from an at rest position to convey material in the repose section toward the outlet end, thereby creating a void in upstream accumulated material, and to receive additional material from the inlet end to fill the void. The repose section can extend substantially laterally at rest.

In one implementation, when the displaceable body segment is installed, the actuator extends from a lower side of the displaceable body segment.

In one implementation, the displaceable body segment extends substantially from the inlet end and substantially to the outlet end.

In one implementation, the repose section is caused to be displaced from a substantially lateral position at rest to tilt downwardly toward the outlet end cyclically.

The foregoing and other objects, features, and advantages will become more apparent from the following detailed description, which proceeds with reference to the accompanying figures.

BRIEF DESCRIPTION OF THE DRAWINGS

FIG. 16 is a table of data used to plot the graph of FIG. 15.

DETAILED DESCRIPTION

Figure 1:
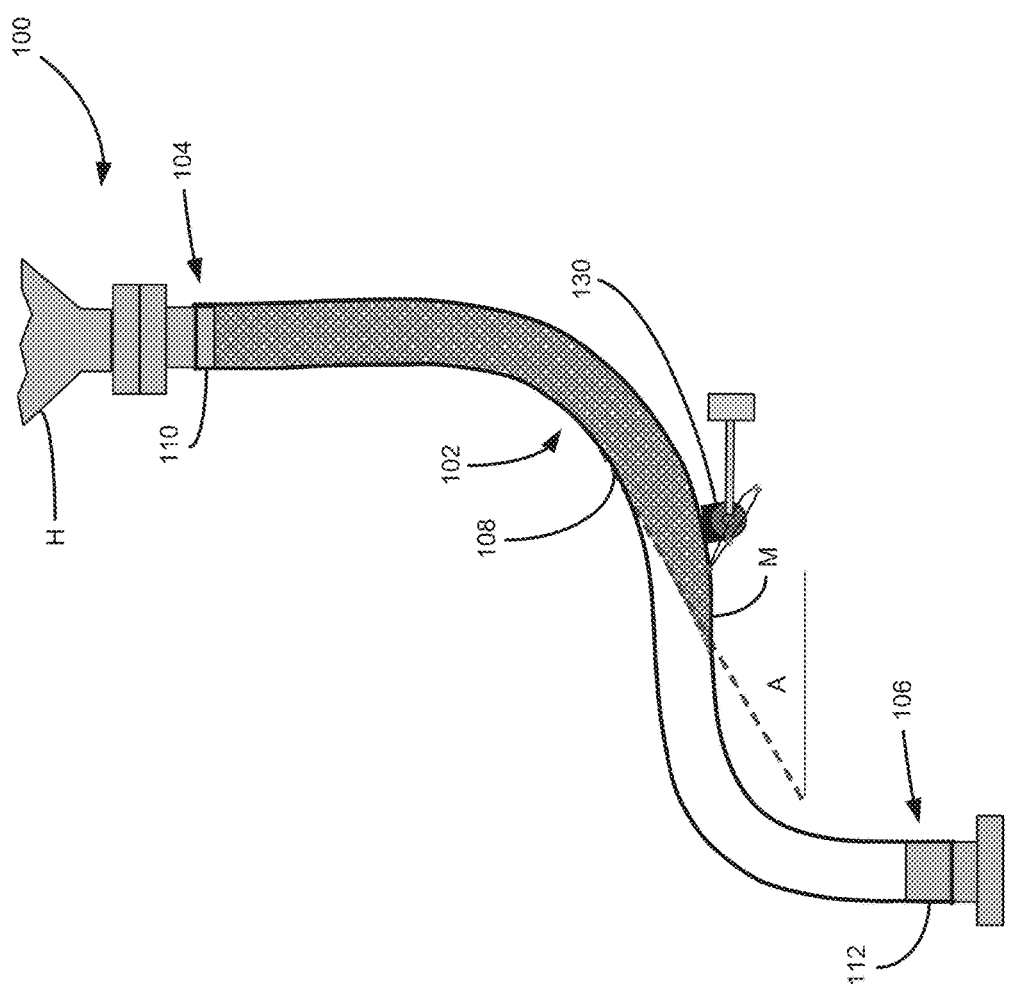
FIG. 1 is side elevation view of a representative implementation of an oscillatory feeder in its at rest position.

Referring to FIG. 1, a side elevation view of a representative implementation of an oscillatory feeder 100 is shown. The feeder 100 has a body 102 that is generally tubular and through which material can be fed. The body 102 has a first end 104 and an opposite second end 106. Between the first and second ends 104, 106, there is a displaceable body segment 108 that can be caused to vibrate or oscillate (or otherwise displace or move) in a cyclical motion, as described below in greater detail, to cause material to be conveyed or fed from the first end 104, through the body 102 and to the second end 106.

In some implementations, the material to be fed is a solid material, such as a flowable, divided solid. Polysilicon is one example of a material that can be provided as a finely divided flowable solid. These materials have a tendency to be constrained by an angle of repose. The individual particles in these materials tend to flow and not "interlock" or "lock up" relative to each other to a great degree. The individual particles of a flowable solid material may have generally the same size and shape, or they vary in size and shape. In some implementations, the flowable solid material could be a mixture of two or more different materials.

In some implementations, the flowable solid material is granular polysilicon, but other forms of polysilicon lacking high frequency of interlocking geometric features are also flowable solids. As used herein, the terms "granular polysilicon" and "granulate polysilicon" and "granules" refer to polysilicon particles that are spheroids having an average diameter of 0.25 to 20 mm, such as an average diameter of 0.25-10 mm, 0.25-5 mm, or 0.25 to 3.5 mm. As used herein, "average diameter" means the mathematical average diameter of a plurality of granules. Individual granules may have a diameter ranging from 0.1-30 mm, such as 0.1-20 mm, 0.1-10 mm, 0.1-5 mm, 0.1-3 mm or 0.2-4 mm. Of course, the feeder 100 is equally effective to feed flowable material(s) other than granular polysilicon and in other particle sizes.

Figure 13:
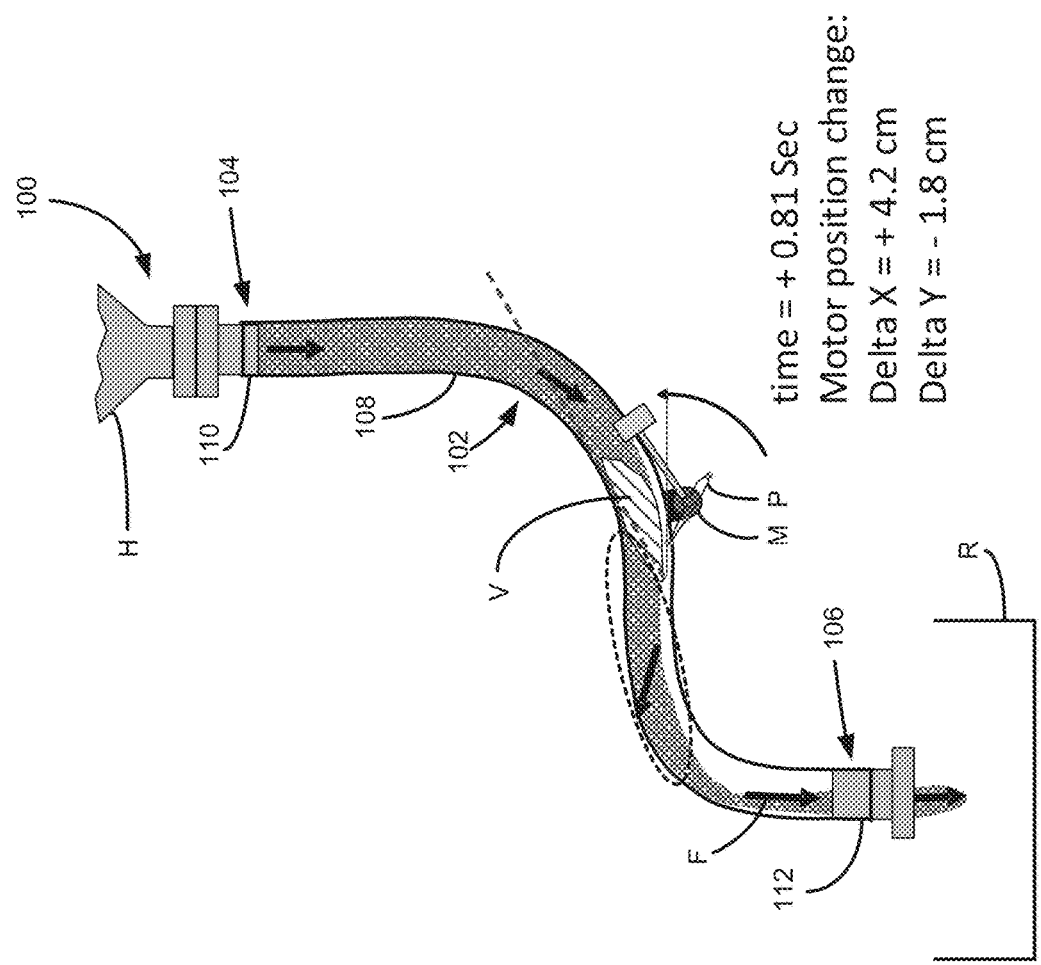

The first end 104 can be connected to an upstream source of material to be fed, such as a material comprising solids. In the illustrated implementation, the first end 104 is connected to the outlet end of a hopper H, which is stationary. Instead of the hopper H, the feeder 100 can be connected downstream of any other component or conduit that supplies material to be fed. The second end 106 can be connected to an outlet from which material fed by the feeder 100 is discharged as shown, or to any other downstream location. As shown in FIG. 13, for example, the second end 106 can convey material to a receptacle R.

The displaceable body segment 108 can have a first fixable location 110, e.g., a location that is positionable at a first fixed location. Similarly, the displaceable body segment 108 can have a second fixable location 112, e.g., a second location that is fixable at a second fixed location. The first and second fixable locations 110, 112 define the approximate ends of the displaceable body segment 108. In the illustrated implementation, the first fixable location 110 is located in the area of the first end 104, and second fixable location 112 is located in the area of the second end 106. In other implementations, the first and second fixable locations 110, 112 can be located at points spaced from the first and second ends 104, 106, respectively, to define displaceable body segments of different lengths and characteristics.

Typically, at least the displaceable body segment 108 is configured to be sufficiently flexible to be displaced as desired, such as by selecting appropriate material(s) and their dimensions. As one example, in the illustrated implementation, the body 102, including the displaceable body segment 108, is formed of a section of flexible polyurethane hose or conduit having an appropriate uniform diameter and wall thickness. In other implementations, one or more different materials may be used for the body 102 and/or displaceable body segment 108, and/or non-uniform wall thicknesses and/or diameters may be used.

As shown in the implementation of FIG. 1, there are no moving parts within the displaceable body segment 108, i.e., there are no moving parts within the internal volume defined by the displaceable body segment 108, which can be designated as part of the control volume for the feeder. This is advantageous because contact between solid material flowing through the displaceable body segment 108 and any moving parts or other sensitive areas causes wear and other problems, particulafly with solid material such as granular polysilicon.

As also shown in FIG. 1, the oscillatory feeder 100 has an actuator, e.g., a motor 130 or other device configured to move the body 102, and in particular the displaceable body segment 108, to cause it to selectively oscillate or otherwise move, typically in a cyclical fashion. The motor 130 is positioned to impart motion to the displaceable segment 108, such as by being mounted to the body 102 as shown (or having a component that contacts the body). The motor 130 can be an electric motor having an eccentric weight. As stated, any other type of actuator or other device sufficient to impart the desired motion to the displaceable body segment 108 could also be used, such as a pneumatic cylinder, a hydraulic cylinder, or a mechanical drive such as a rack and pinion assembly powered by a servo motor, as a few examples.

Referring to FIG. 1, the body 102 has an S-shaped profile in elevation. In the vertical direction, the first end 104 is positioned at a level above the second end 106. In the horizontal direction, the first and second ends 104, 106 are offset from each other. The S-shaped profile of the body 102 has two curves bending in opposite directions in a single plane that meet at inflection point within the displaceable body segment 108. Other configurations can also be used, depending on the particular operating requirements for the application. In the illustrated implementation, the motor 130 is positioned to have its rotational axis substantially perpendicular to the displaceable body segment 108.

Referring again to FIG. 1, the body 102 is shown as a transparent component to allow its interior and the material M to be illustrated. The feeder 100 is shown partially filled with material M that has come to rest at an intermediate point within the body 102. A leading edge or head portion of the material M, which is inclined from left to right in FIG. 1, in inclined at the material's angle of repose A. In the illustrated implementation, e.g., the angle of repose for the material M, such as granular polysilicon material, is approximate 31°. The section of the body 102 in FIG. 1 where the material M is at rest can be described as a repose section. The repose section can be level in the downstream direction as shown (i.e., from right to left in FIG. 1), angled upwardly or angled downwardly, together with any necessary change to the section's length to ensure that sufficient run out is provided, to assist in ensuring that no flow occurs when the feeder 100 is not operating. The segments adjacent the first and second ends 104, 106 can be relatively upright as shown to have the material flowing into and out of the body 102 assisted by gravity to a maximum degree, but other configurations are also possible.

By displacing or moving the displaceable body segment 108 as described in more detail below, the material M can be moved or feed through the body 102 along a feed path as indicated generally by the arrows F (see, e.g., FIGS. 2, 5, 6, 9-13) and out through the second end 106 to a subsequent component and/or location.

Figure 2:
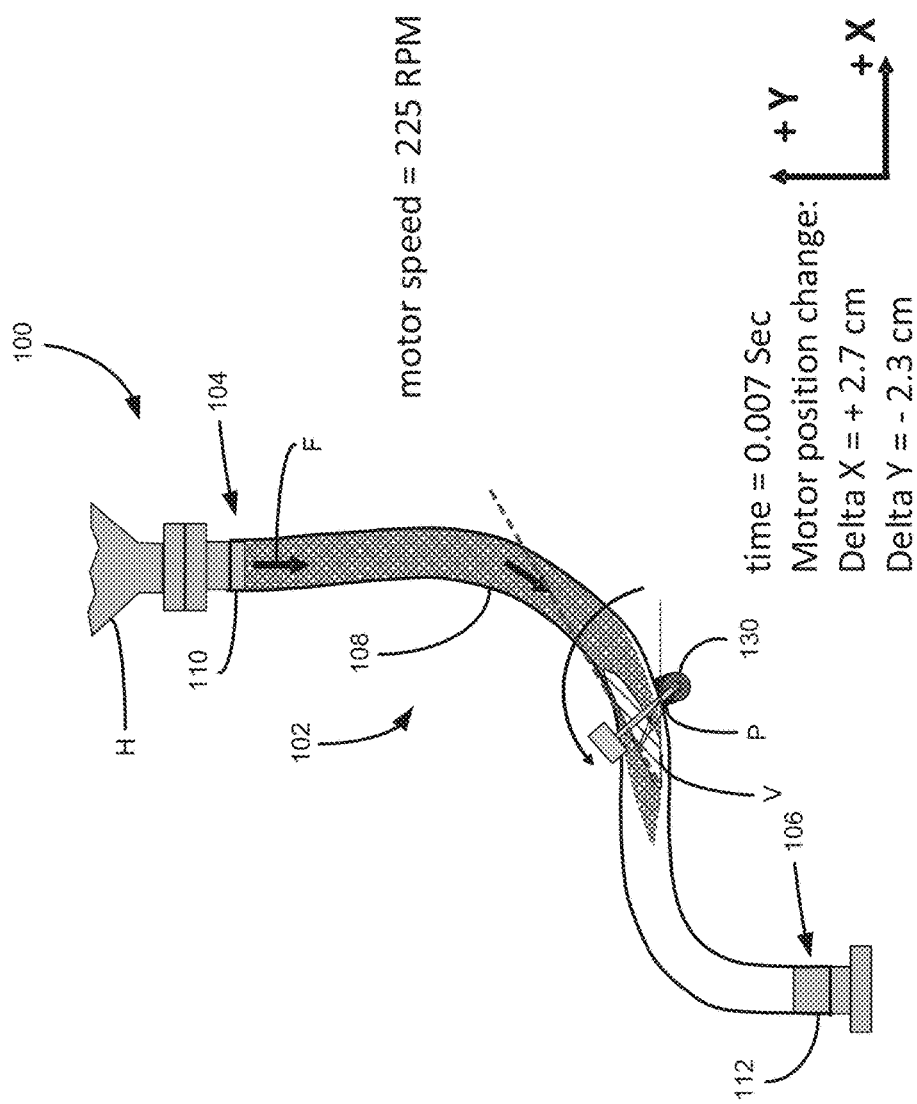
FIGS. 2-13 are side elevation views of the oscillatory feeder of FIG. 1 schematically showing the feeder of FIG. 1 and material being fed with the feeder in different positions throughout several cycles of motion.

The steady state cyclical motion of the feeder 100 in a representative operating scenario is shown in FIGS. 2-13. Specifically, FIGS. 2-13 are additional side elevation views of the feeder 100 showing how operation of the motor 130 causes oscillatory motion of the displaceable body segment 108. Referring to FIG. 2, during steady state operation of the motor 130 at a speed of 225 RPM in the counterclockwise direction, the position of the motor 130 has moved to the right and down. Specifically, at a time of 0.07 seconds relative to an arbitrary starting point on the motor's steady state trajectory, the motor 130 has moved 2.7 cm to the right (Delta X=+2.7 cm) and 2.3 cm down (Delta Y=−2.3 cm). Because the motor 130 is attached to the displaceable body segment 108, the displaceable body segment has substantially the same motion as the motor 130.

Figure 3:
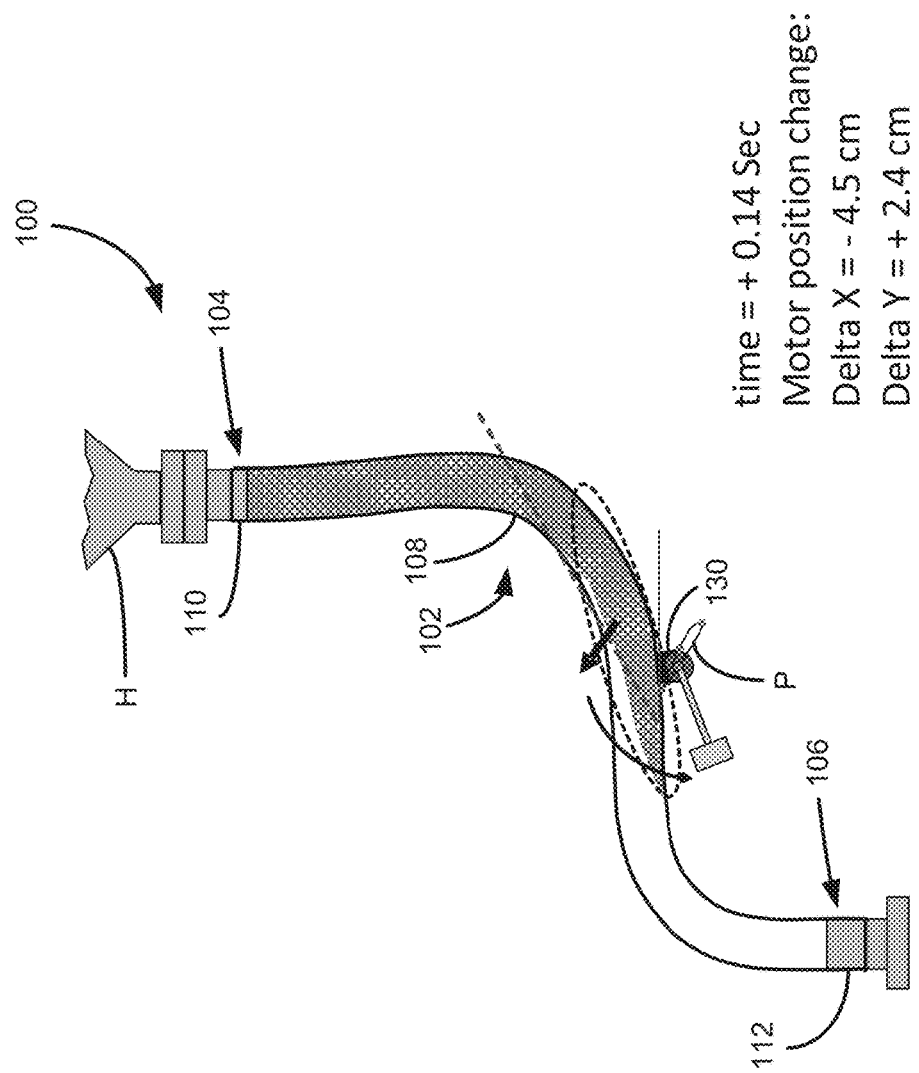
Figure 14:
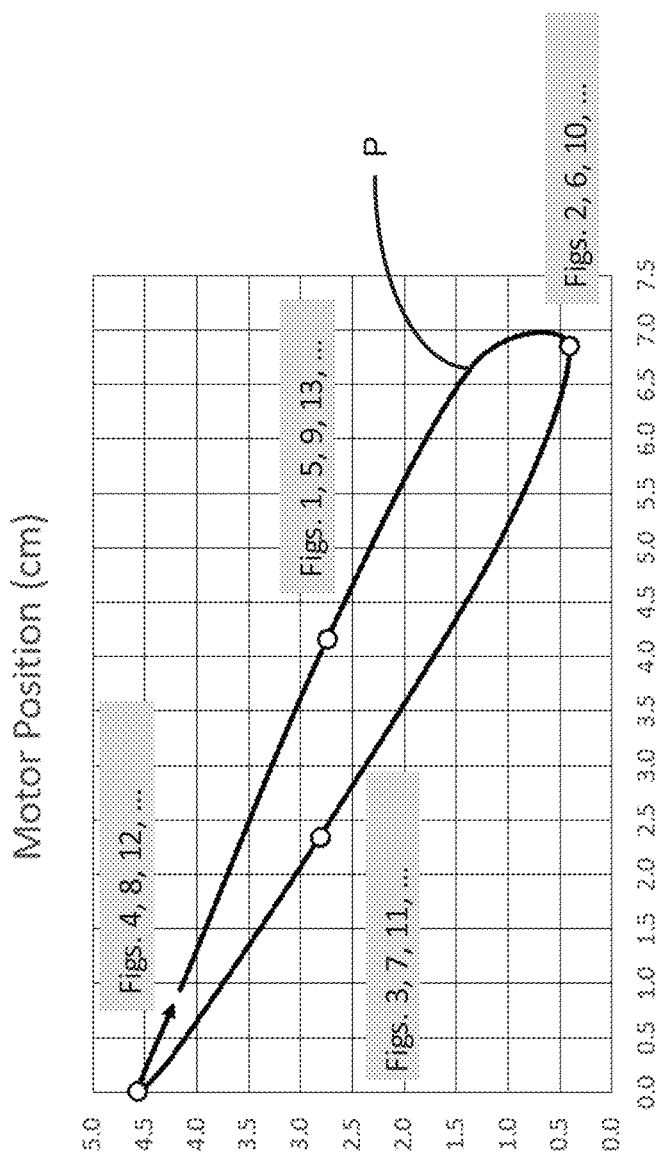
FIG. 14 is a graph showing the trajectory of the motor and a segment of the body of the feeder through a cycle with reference to the positions shown in FIGS. 2-13.

As the displaceable body segment 108 moves down to the right, the material M, and specifically, the granules that make up the material M, have a relative velocity that is in a direction up to the left, thereby creating a void V in the material M as shown schematically in FIG. 2. The growing void V is not constrained by the material's angle of repose, and so material will begin to flow from right to left, beginning in the repose section along the flow path F. As flow of material continues, the void V will be filled, and additional material from the hopper H will enter the body 102 to replace the material flowing away from the repose section. It can be said that the material being fed is entrained in pockets and sequentially moved throughout the feeding process. A profile or trajectory P of the cyclical motion of the motor 130/displaceable body segment 108, which is described below in greater detail in connection with FIG. 14, is shown superimposed on the rotational axis of motor 130 in FIGS. 2-13. Subsequently, as shown in FIG. 3, while the motor speed is maintained at 225 RPM and at 0.14 seconds, the displaceable body segment 108 and the material M are accelerated up to the left. The void V is collapsed, and the material M is once again constrained by its angle of repose, but at position farther along the flow path F. Flow from the hopper H is stopped. At the point shown in FIG. 3, the motor 130/displaceable body segment 108 have moved 4.5 cm to the left (Delta X=−4.5 centimeters), and 2.4 cm up (Delta Y=2.4 cm) from the position shown in FIG. 2.

Figure 4:
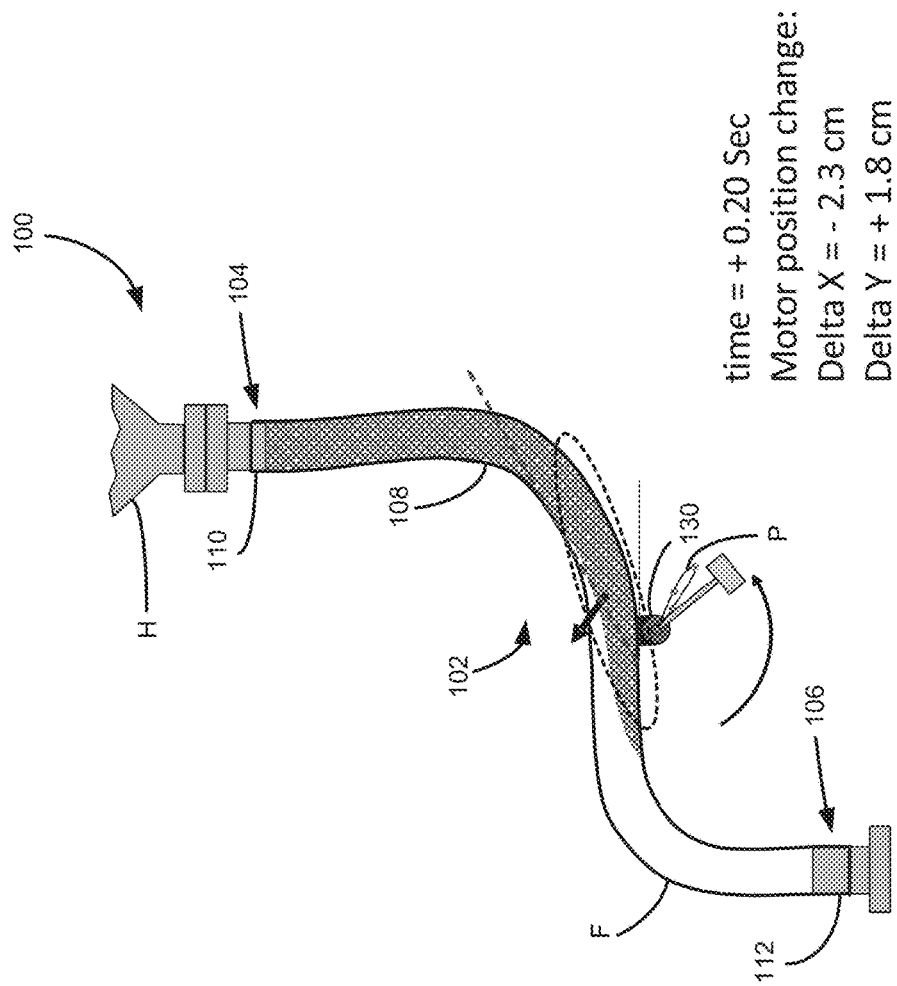

In FIG. 4, at 0.20 seconds, the displaceable body segment 108 reaches its left most position, stops and starts to move down to the right again. The material M maintains its velocity in a direction up to the left. Relative flow between the hopper H and body 102 remains stopped. At this point, Delta X=−2.3 cm and Delta Y=1.8 cm relative to the position shown in FIG. 3.

Figure 5:
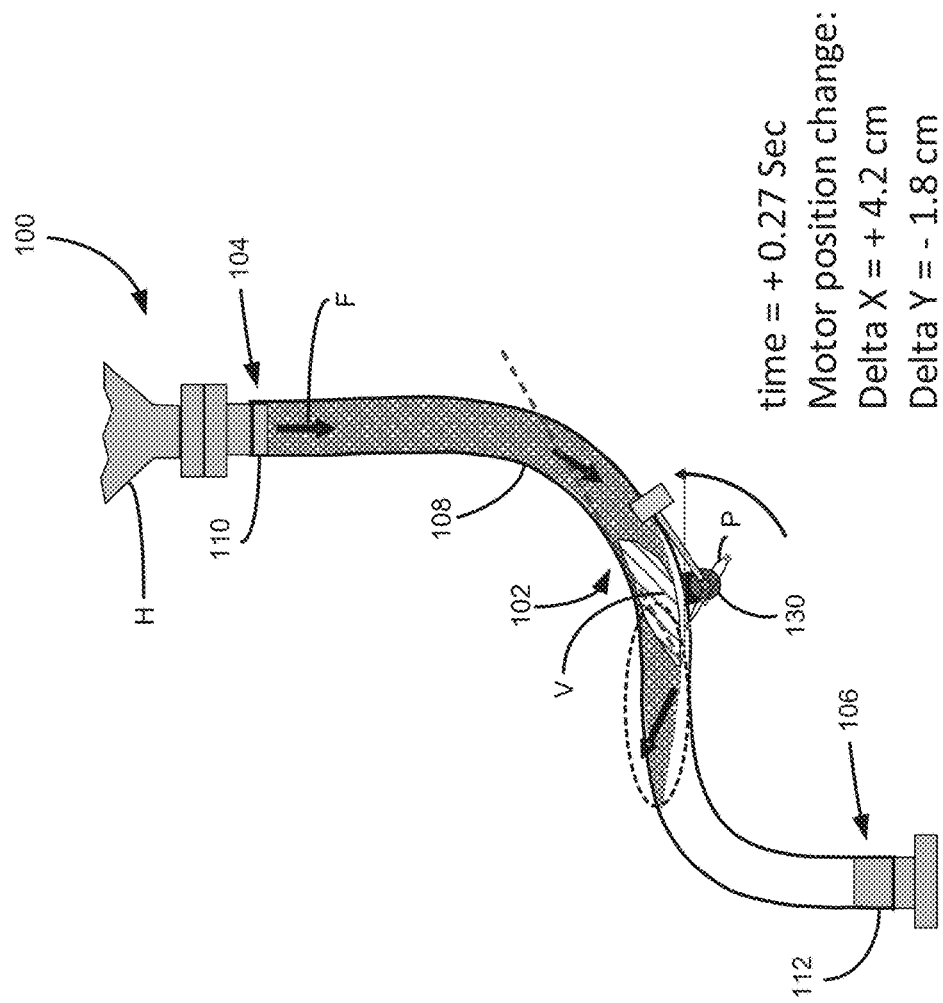

In FIG. 5, at 0.27 seconds, the inertia of the material M causes continued motion up to the left with the displaceable body segment 108 moving down to the right. At this point, the relative velocity is at its maximum. The flow at the head portion of the material along with the displaceable body segment 108 moving down to the right produces a more rapidly growing void V. Because the material M is not constrained by its angle of repose, flow of material starts to fill the void V. Flow from the hopper H resumes to replace material flowing below. At this point, Delta X=4.2 cm and Delta Y=−1.8 cm relative to the position shown in FIG. 4.

Figure 6:
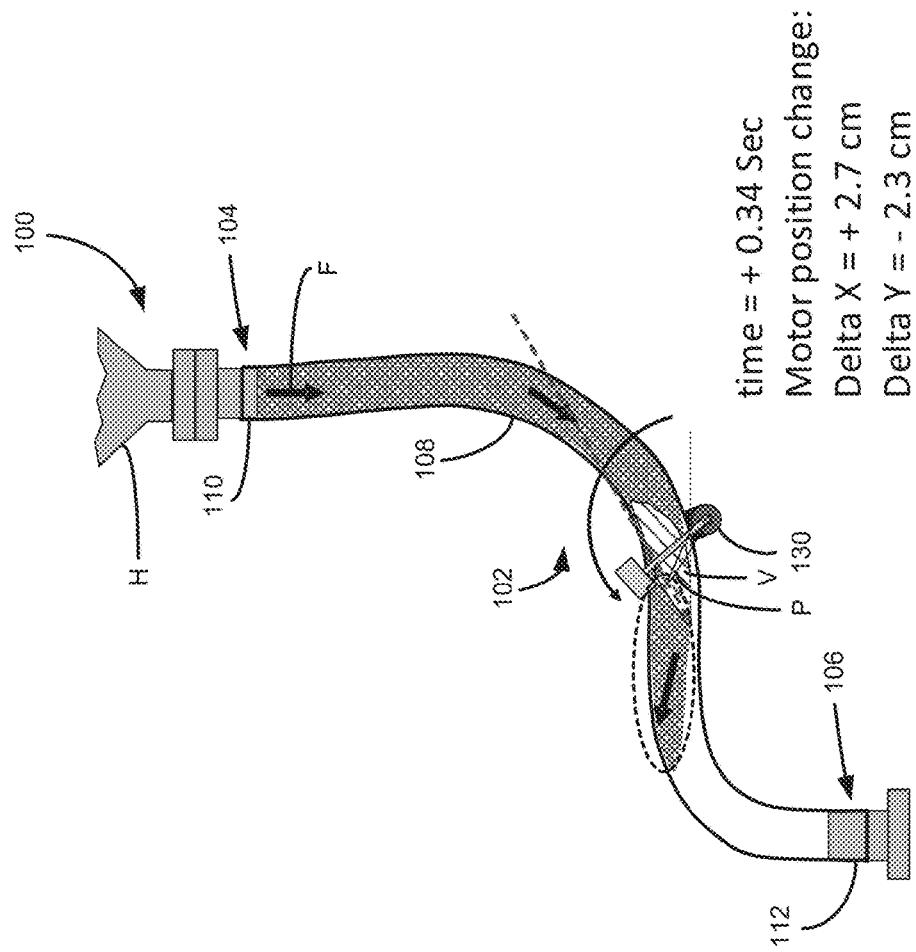

In FIG. 6, at 0.34 seconds, the inertia of the material M allows continued motion up to the left at the head portion of the material. With the material continuing to flow, along with movement of the displaceable body segment 108 down to the right, voiding continues to take place. Because the material is not constrained by its angle of repose, flow continues to fill the void. Flow from the hopper H continues to replace material flowing below. At this point, Delta X=2.7 cm and Delta Y=−2.3 cm relative to the position shown in FIG. 5.

Figure 7:
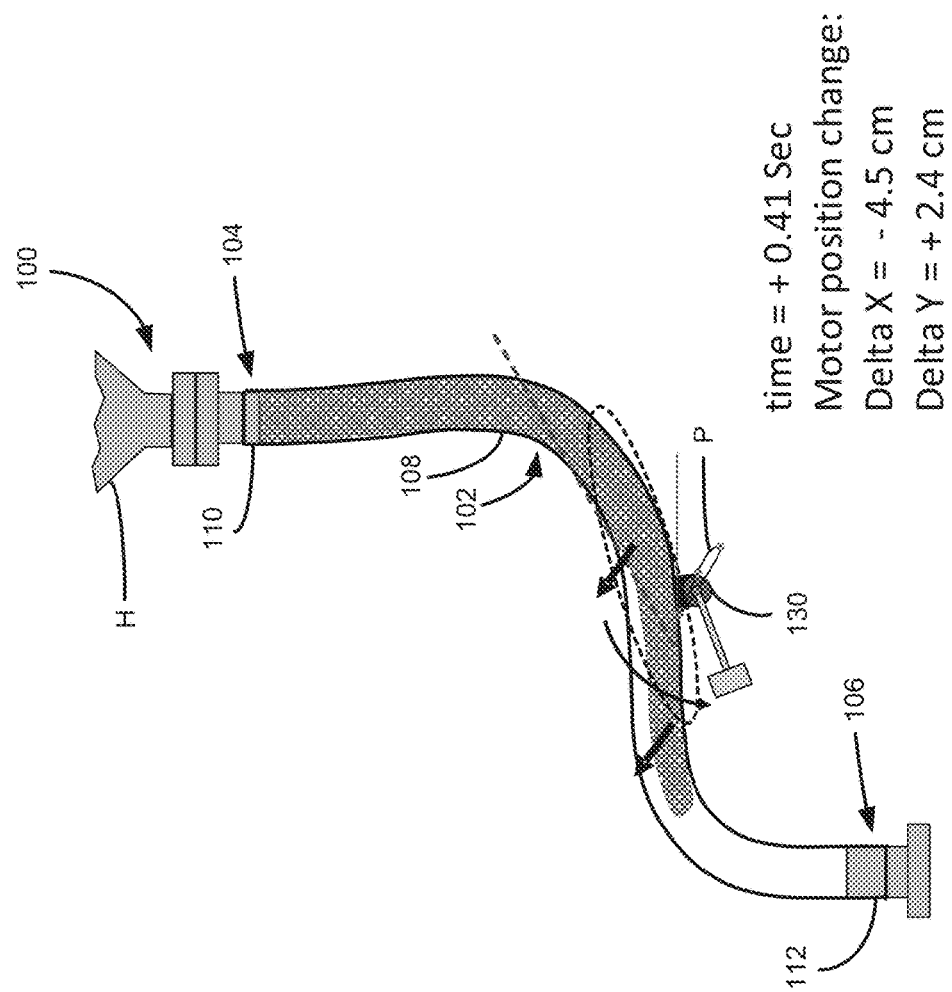

In FIG. 7, at 0.41 seconds, the head of the material M can be seen advancing along the flow path F. The displaceable body segment 108 and material M are accelerated up to the left. The void V has collapsed, and granular material is once again constrained by its angle of repose. Relative flow between this granular material and the downstream section of the displaceable body segment 108 has stopped. Flow from the hopper H has stopped. At this point, Delta X=−4.5 cm and Delta Y=2.4 cm relative to the position shown in FIG. 6.

Figure 8:
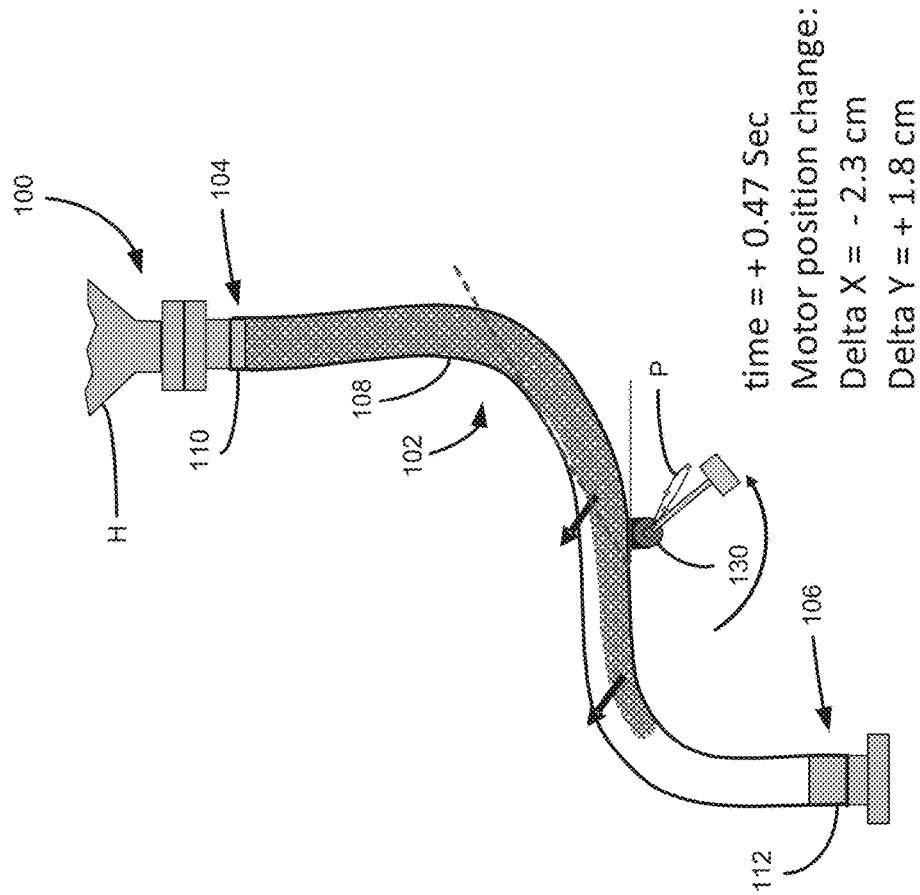

In FIG. 8, at 0.47 seconds, the material M is advancing farther along the flow path F. The displaceable body segment 108 has reached its upper left most position. It will then stop, and start to move down to the right. The inertia of the material M remains in a direction up to the left. Relative flow in the downstream direction in the displaceable body segment 108 has stopped. Flow from the hopper H has stopped. At this point, Delta X=−2.3 cm and Delta. Y=1.8 cm relative to the position shown in FIG. 7.

Figure 9:
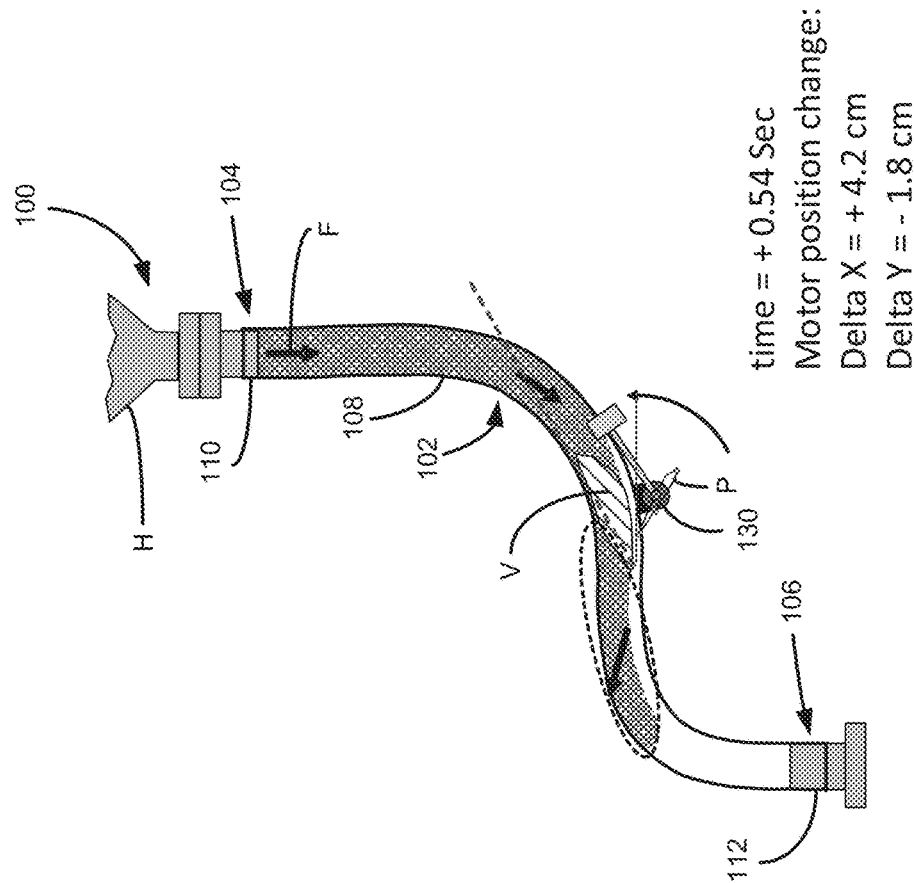

In FIG. 9, at 0.54 seconds, the displaceable body segment 108 is moving down to the right and has reached its maximum velocity. The flow in the displaceable body segment 108 produces a more rapidly growing void V. Because the material is not constrained by its angle of repose, material starts to fill the void. Flow from the hopper H resumes to replace material flowing below. At this point, Delta X=4.2 cm and Delta Y=−1.8 cm relative to the position shown in FIG. 8, i.e., the same position as is shown in FIG. 5. Thus, one cycle is depicted in the sequence from FIG. 5 through FIG. 9.

Figure 10:
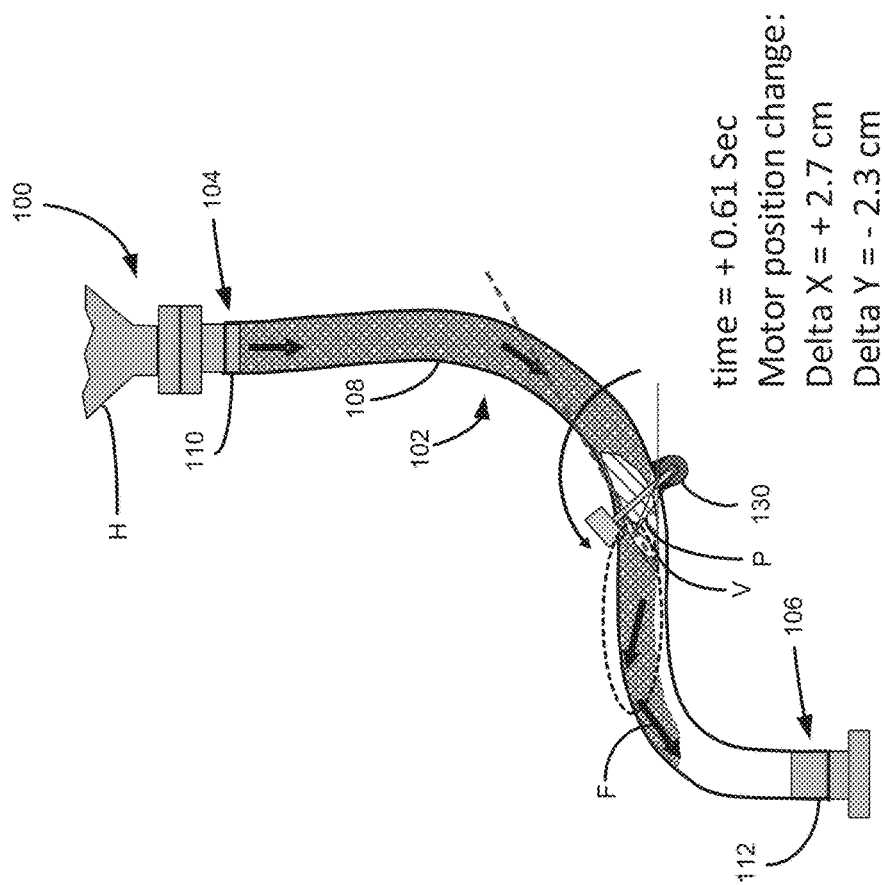

In FIG. 10, at 0.61 seconds, the inertia of the material M allows continued motion up to the left along the displaceable body segment 108 and into a discharge segment of the body 102. The discharge segment can be positioned substantially upright as shown. With the material continuing to flow along the flow path, along with movement of the displaceable body segment down to the right, voiding continues to take place. Because material is not constrained by its angle of repose, flow continues to fill the void. Flow from the hopper H continues to replace material flowing below. At this point, Delta X=2.7 cm and Delta Y=−2.3 cm relative to the position shown in FIG. 9.

Figure 11:
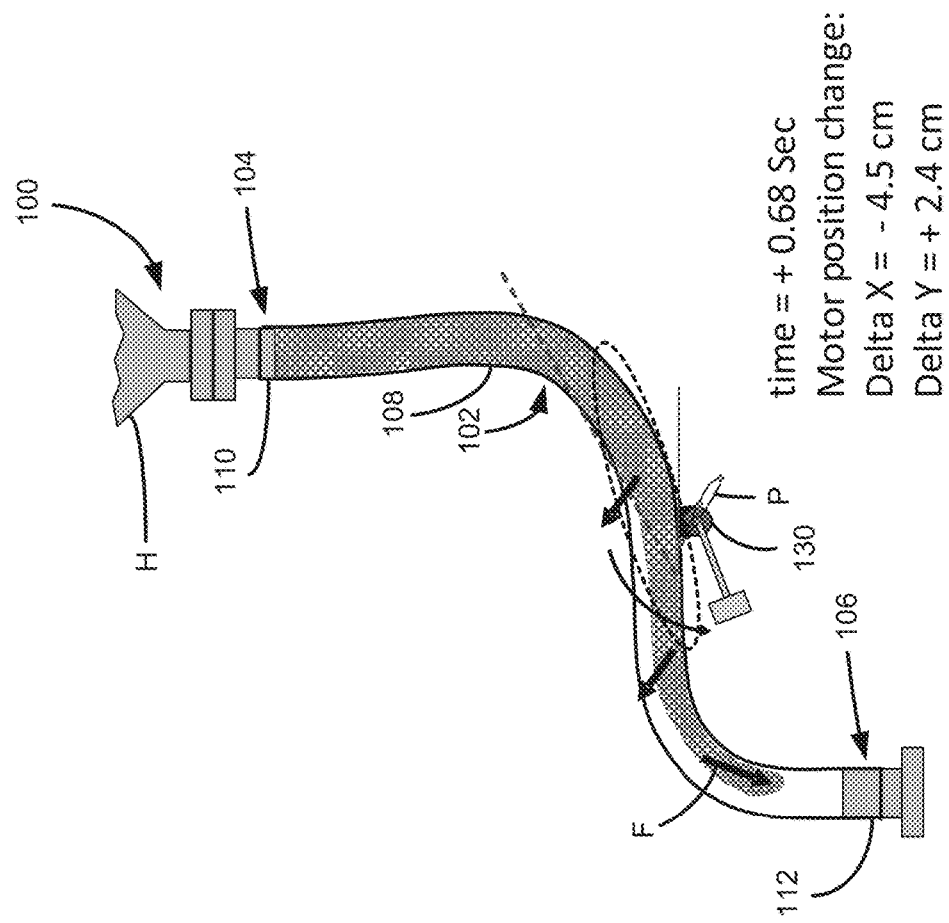

In FIG. 11, 0.68 seconds, the head portion of the flow of material along the flow path begins to fall from above through the discharge section toward the second end 106. Material is also advancing elsewhere along the flow path. The displaceable body segment 108 and the material M are accelerated up to the left. The void has collapsed, and material is once again constrained by it angle of repose. Flow between the repose section and points downstream has stopped. Also, flow from the hopper H has stopped. At this point, Delta X=−4.5 cm and Delta Y=2.4 cm relative to the position shown in FIG. 10.

Figure 12:
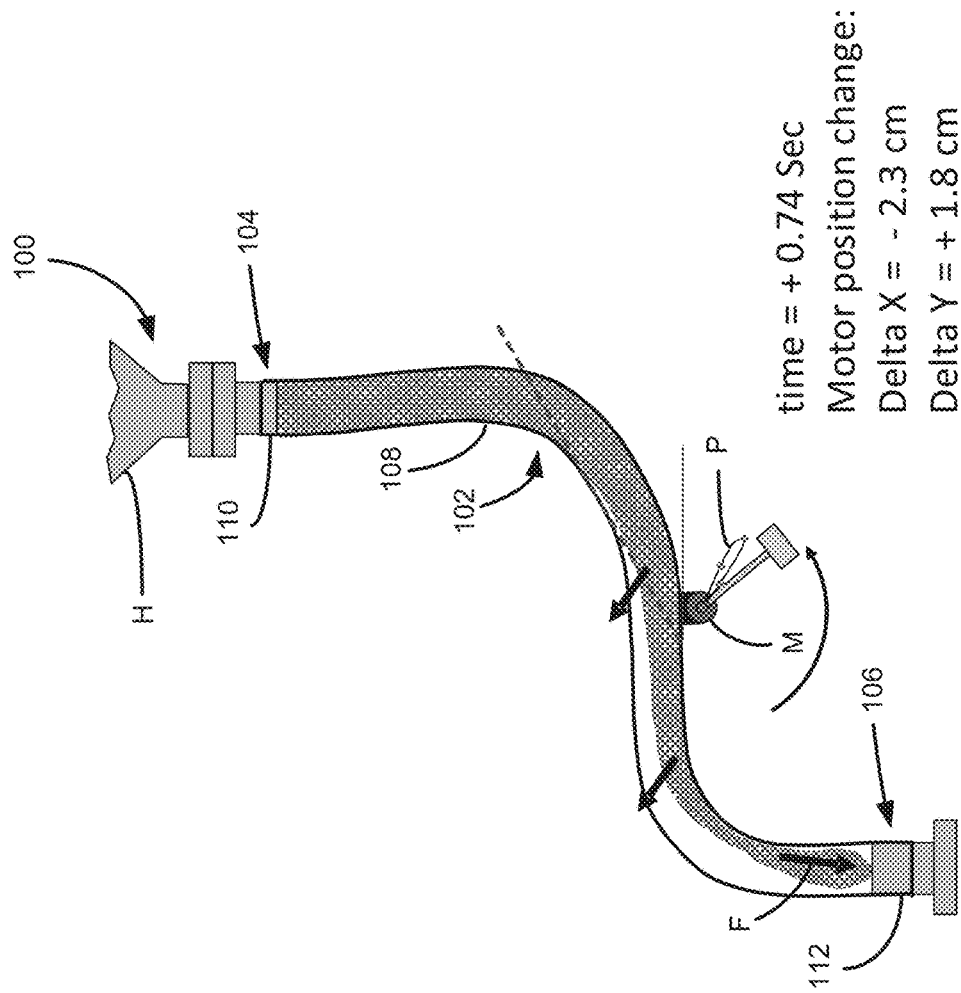

In FIG. 12, at 0.74 seconds, material at the head portion of the flow continues to fall toward the end 106. Material is also advancing through intermediate points along the flow path. The displaceable body segment 108 has reached the upper left most position, stopped and started to move down to the right again. The material M has maintained its velocity up to the left. Flow between the angle of repose section and downstream segments has stopped. Flow from the hopper has stopped. At this point, Delta X=−2.3 cm and Delta Y=1.8 cm relative to the position shown in FIG. 11. In FIG. 13, at 0.81 seconds, material at the head portion of the flow, continues to fall as accelerated by gravity through the second end 106 and is discharged from the feeder 100. Material is advancing through the displaceable body segment 108 with the displaceable body segment 108 moving down to the right, The relative velocity of the displaceable body segment 108 is at its maximum. The flow in the angle of repose section causes a void V to grow. Because the material is not constrained by its angle of repose, flow starts to fill the void. Flow from the hopper H resumes to replace material flowing below. At this point, Delta X=4.2 cm and Delta Y=−1.8 cm relative to the position shown in FIG. 12.

As described above, FIG. 14 is a graph of X axis and Y axis motion of the motor 130 and the displaceable body segment 108 showing their trajectory P and including references to show how the positions of FIGS. 2-13 correlate to points on the trajectory. Although FIGS. 2-13 show specific times for convenience of illustration, the motion throughout the cycle continues smoothly between discrete points as indicated by the trajectory P. Although not specifically shown in the figures, there would typically be a smooth ramping up of speed to the desired operating speed (e.g., 225 rpm).

Figure 15:
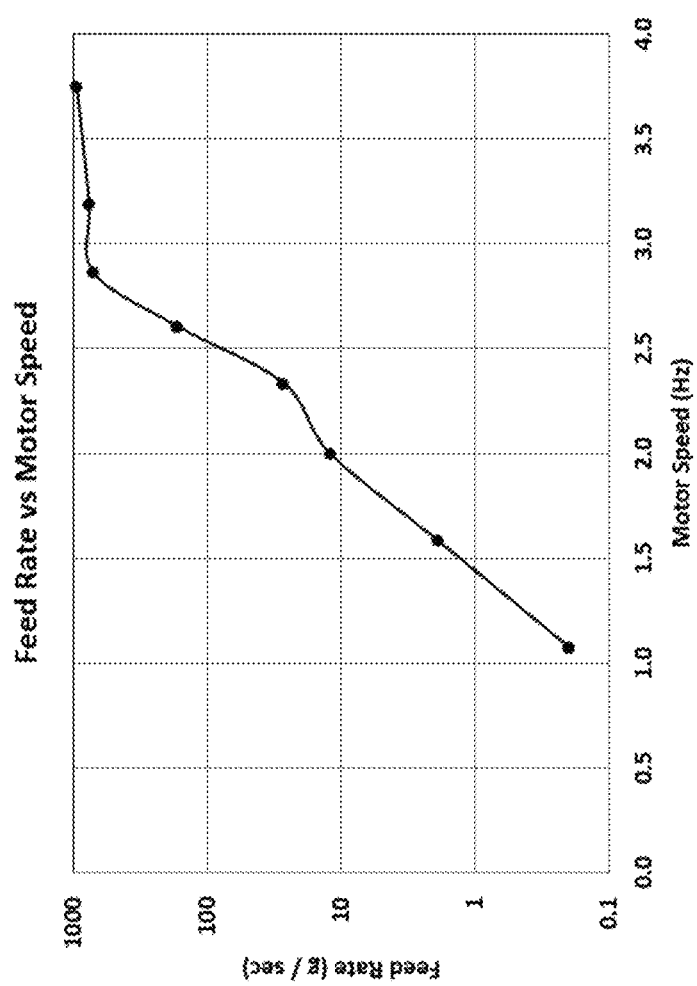
FIG. 15 is a graph of feed rate for the oscillatory feeder vs motor speed.

FIG. 15 is a graph showing how feed rate through the oscillatory feeder 100 for the material (in g/second, and plotted on a logarithmic scale) increases as the rotational speed of the motor 130 (in Hz) is increased. FIG. 16 is a table providing data points for the graph of FIG. 15. Overall, the oscillatory feeder 100 shows excellent results with a predictably increasing feed rate as motor speed is increased, and a wide usable range. Repeated tests have shown that these results are reproducible and accurate.

At high speeds, the eccentric weight of the motor 130 provides both a high centrifugal force and a high frequency to produce a high feed rate. Conversely, at low speeds, the eccentric weight provides a low centrifugal force amplitude at a low frequency. The motion of a representative oscillatory feeder was studied using video analysis. Feed rate data corresponding to the video analysis was obtained by evaluating a mass vs. time relationship of the feeder's discharge. The mass of the material collected from the discharge was weighed in a container supported by a load cell (such as, e.g., a Model RAP3 single point load cell provided by Loadstar Sensors of Fremont, Calif.), Comparisons of this measured feed rate data with a calculated feed rate based on modelling the feeder as a positive displacement pump show excellent agreement.

By way of contrast to conventional vibratory feeders, the oscillatory feeder 100 operates in a different frequency-amplitude regime. Referring again to FIG. 16, the oscillatory feeder in a representative embodiment operates over a frequency range of 1.08-3.75 Hz and has a maximum amplitude of about 80 mm (at 100% speed, with the repose section at an average incline of about 30 degrees from horizontal). In contrast, a conventional electromagnetic driven rigid tray feeder operates over a frequency range of 20-60 Hz and an amplitude of 1-11 mm. Similarly, a conventional eccentric motor driven rigid tray feeder operates over a frequency range of 15-30 Hz and an amplitude of 1-10 mm. Likewise, another conventional mechanically driven rigid tray feeder operates over a frequency range of 5-15 Hz and an amplitude of 3-15 mm. Thus, the oscillatory feeder operates over a much lower frequency range and reaches a much greater amplitude.

The electric motor 130 may be configured to be controlled by a variable frequency drive (VFD), either as a separate component or provided integrally with the motor. Such a VFD-controlled motor provides precise control over the speed of the motor, and thus allows a desired flow rate to be achieved. As a result of the frequency-amplitude control of the feeder, the oscillatory feeder is capable of a flow rate range of 1:4700, which is far greater than the flow rate range of about 1:50 achievable with a conventional vibrating tray feeder.

Because the oscillatory feeder 100 can achieve flow rates ranging from a trickle flow at very low motor speeds to very high flow rates at high motor speeds, it can be operated in a variety of different ways, which increases the flexibility of its use. As one example, in operating the feeder to reach a target weight of material to be output, the feeder can be operated at high speed for an initial period and then at low speed for a subsequent period as the target weight is approached. Thus, the feeder is very well suited for use in a continuous process where flow control of material is required. The feeder can be used as a gravimetric feeder in bulk filling applications.

Figure 19:
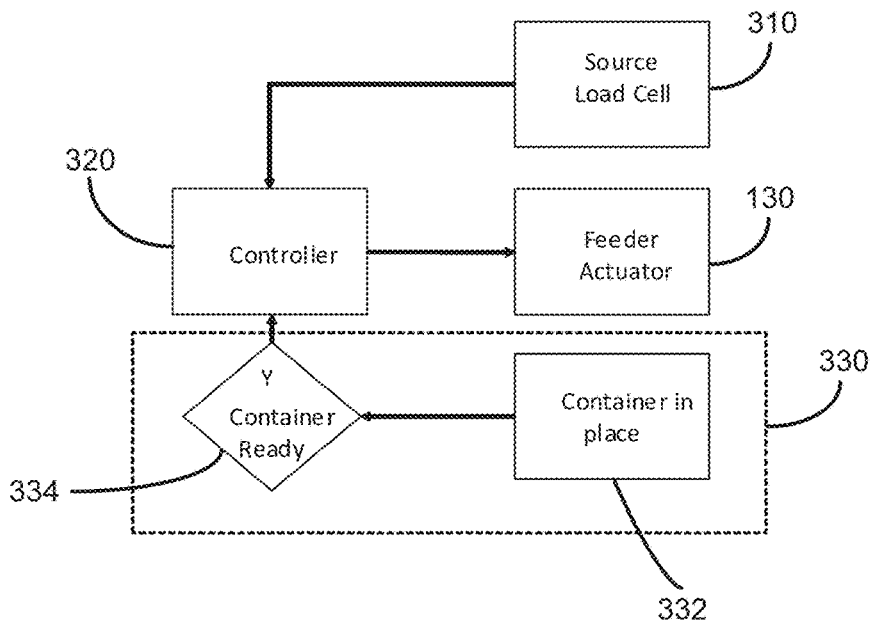
FIG. 19 is a schematic block diagram of a representative control circuit for regulating operation of the feeder as a gravimetric feeder according to control based on a loss of weight.

FIG. 19 is a schematic block diagram of a control system for the oscillatory feeder 100 configured as a gravimetric feeder. In gravimetric feeding, material is fed into a process at a constant weight per unit of time since weight is a variable that can be readily captured by a weighing module. According to the loss in weight type of gravimetric feeding of FIG. 19, the amount of material fed into the process is weighed at a source of the material. Thus, there is a source load cell 310 coupled to a container representing the source of material (not shown, but generally located upstream of the feeder 100) that is connected to a controller 320 to send signals corresponding to the container's loss in mass during a feeding operation. The controller 320 is connected to the feeder actuator (i.e., the motor 130) or other moving mechanism to send control signals to carry out controlled operation of the feeder 100 in reaching a desired target, e.g., conveying a desired mass of the material, including through control of the flow rate of material. Additional feedback control could also be used.

As also shown in FIG. 19, an optional logic circuit 330 with a container sensor 332 and a container sensor circuit 334 can be provided. If provided, the container sensor 332 can be configured to monitor whether a receiving container, such as the receptacle in FIG. 13, is in place. The container sensor circuit 334 can be configured to send a signal to the controller 320 to indicate that a receiving container is in place (container ready=Y) and that a feeding operation can be commenced.

Figure 20:
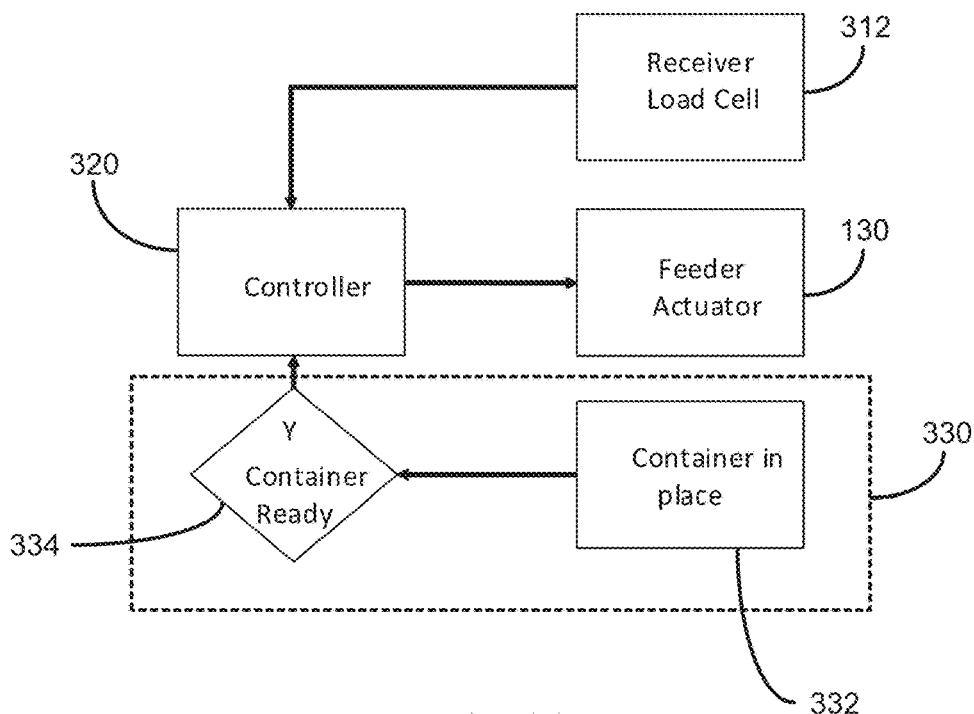
FIG. 20 is a schematic block diagram of a representative control circuit for regulating operation of the feeder as a gravimetric feeder according to control based on a gain in weight.

FIG. 20 is similar to FIG. 19, but shows a schematic block diagram for the oscillatory feeder 100 configured as a gain in weight type gravimetric feeder. According to the gain in weight type of gravimetric feeding of FIG. 20, the amount of material fed into a process is weighed at a receiving container. Thus, there is a load cell or other equivalent sensor 312 coupled to the receiving container (such as the receptacle R). The sensor 312 is connected to the controller 320 to send signals indicating the receiving container's gain in mass during a feeding operation. As above, the controller 320 carries out a feeding algorithm and sends control signals to the motor 130 or other mechanism. Also, the optional logic circuit 330 can be implemented, if desired.

Figure 21:
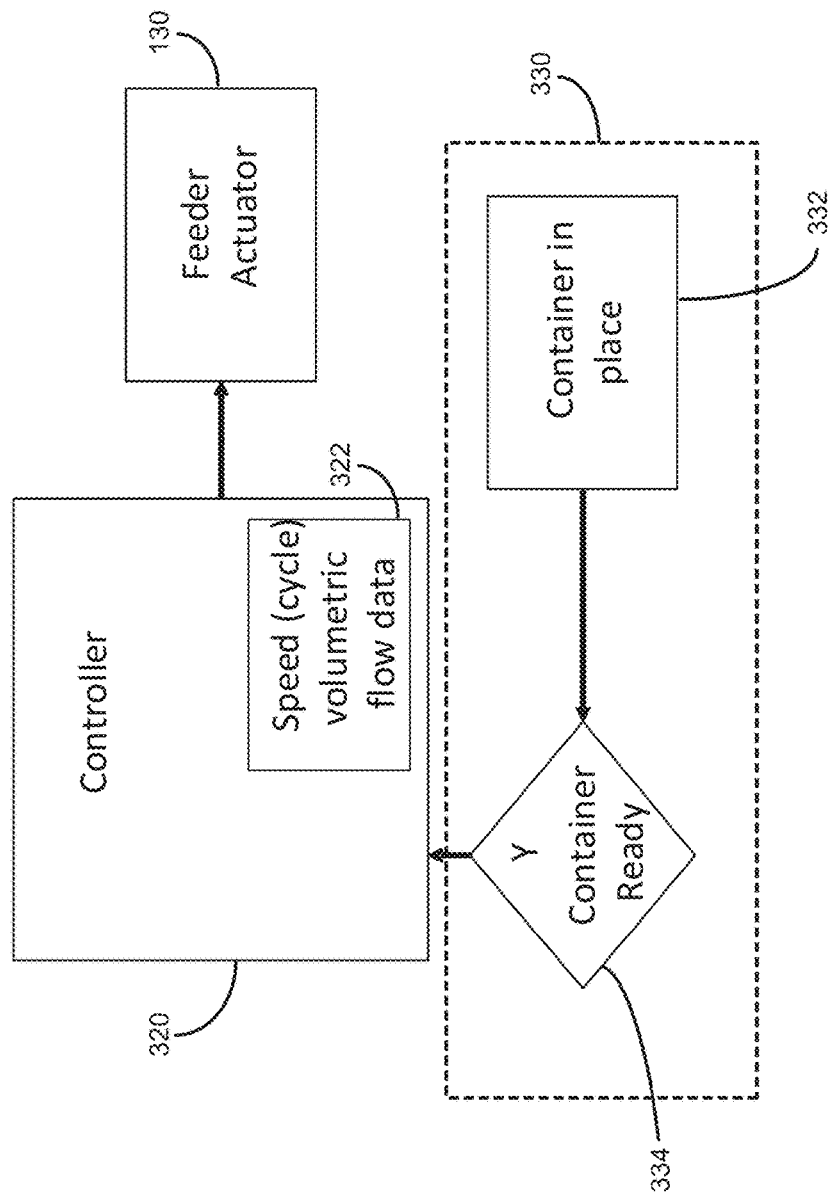
FIG. 21 is a schematic block diagram of a representative control circuit for regulating operation of the feeder as a volumetric feeder.

FIG. 21 is similar to FIGS. 19 and 20, but shows a schematic block diagram for the oscillatory feeder 100 configured as a volumetric feeder instead of a gravimetric feeder. As indicated, the controller 320 is connected to send control signals to the motor 130 based on a control algorithm based on stored data 322, such as speed (cycle) volumetric flow data describing a relationship between operating speed of the motor and flow rate. Also, the optional logic circuit 330 can be implemented, if desired.

In the feeder 100, only the displaceable body segment 108 and motor 130 move during operation, so there are no internal moving parts. In the illustrated implementation, the feeder 100 typically eliminates at least one valve, which is one specific component having internal moving parts. As a result, the feeder 100 tends to be less costly to produce and maintain and more reliable than conventional feeding technologies having internal parts. Many internal parts are subject to fouling during operation and are prone to wear faster, particularly in applications where feeding of granular polysilicon material is involved. Maintenance or repair of such internal parts requires considerable downtime.

In the feeder 100, there are fewer components and fewer different materials that contact the material being fed than in conventional feeders. As a result, there is a much lower risk of contamination to the material being fed. In some implementations of the feeder 100 used for feeding high purity granular polysilicon, the body 102 is made of a single length of polyurethane hose that poses little contamination risk.

As stated, at least the displaceable body segment 108, or the entire body 102, can be configured to be flexible so that it can be resiliently deformed or distorted, e.g., through the positions shown in FIGS. 2-13 and the trajectory P of FIG. 14. In some implementations, the body is made of a section of flexible hose, such as a hose made of polyurethane material having sufficient thickness to withstand selected operating requirements. Suitable polyurethane hose suppliers include, e.g., Kuriyama of America, Inc. (see, e.g., Tigerflex Model VOLT200 at http://products.kuriyama.com/category/tigerflex-thermoplastic-industrial-hoses), Masterduct Inc. (http://www.masterduct.com/material-handling-hoses), Hosecraft USA (https://www.hosecrafhusa.com/application/Material_Handling_Hoses) and Norres Schlauchtechnik GmbH (http://www.norres.com/us/products/industrial-hoses-technical-hoses/). It is of course possible to use other materials (such as, e.g., EPDM rubber, Styrene-butadiene rubber, natural rubber, other elastomeric materials, other resilient materials, etc.) to achieve the desired flexibility of the displaceable body segment 108. In addition, it would be possible to configure the body to have multiple segments of different materials and/or to have multiple layers. Further, in some implementations, it may be desirable to include a bellows section along a section of the displaceable body segment. As stated, contact metal contamination of the material being fed can be reduced by using components and/or coatings made of selected materials, including polyurethane.

Figure 18:
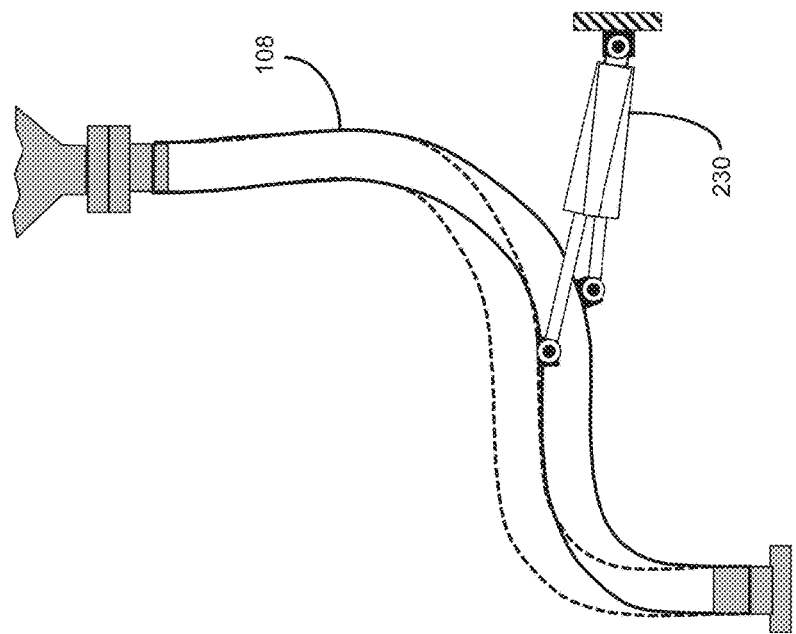
FIGS. 17-18 are side elevation views of another implementation of the oscillatory feeder in which the actuator for moving the body is a double acting pneumatic cylinder.
Figure 17:
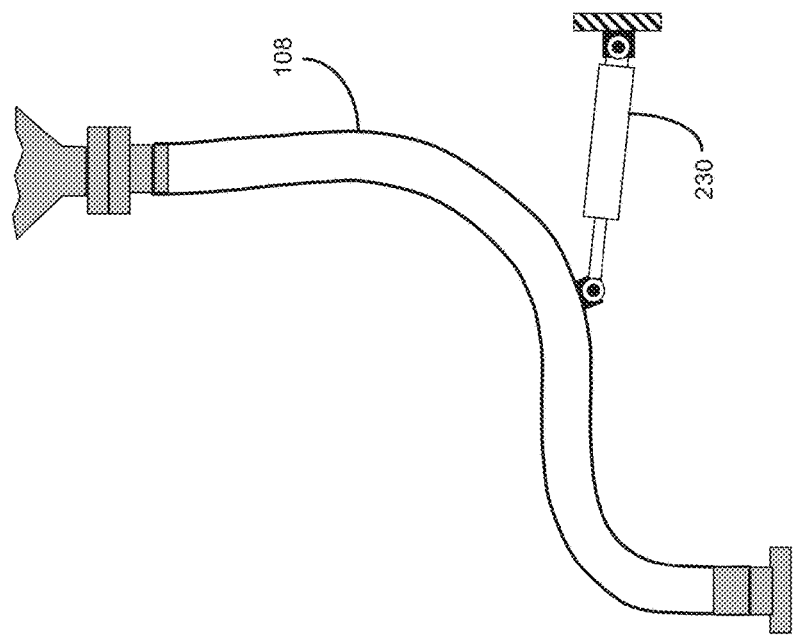

FIGS. 17 and 18 are schematic illustrations of an alternative implementation in which a double acting pneumatic cylinder 230 or other linear actuator is used to impart the desired motion to the displaceable body segment 108 instead of the motor 130. As shown in FIG. 17, the movable end of the cylinder 230 is connected to the displaceable body segment, and the opposite stationary end is connected to a fixed location. The cylinder 230 would also be supplied by suitable fluid source to move back and forth and to pivot to achieve the desired motion (such as is shown schematically in FIG. 18) and corresponding desired feed rate. Of course, mechanisms other than the motor 130 and the cylinder 230 could be used to move the displaceable body segment.

In view of the many possible embodiments to which the disclosed principles may be applied, it should be recognized that the illustrated embodiments are only preferred examples and should not be taken as limiting in scope. Rather, the scope is defined by the following claims. I therefore claim all that comes within the scope and spirit of these claims.

I claim:

1. An oscillatory feeder operable to convey a flowable solid material, comprising:
   a tubular body having at least one first end, at least one second end opposite the first end and a displaceable body segment between the first and second ends and defining a feed direction extending generally from the first end to the second end;
   the displaceable body segment having a first fixable location positionable at a first fixed location and a second fixable location positionable at a second fixed location, the displaceable body segment when installed having defined therein a repose section configured to support accumulated solids at an angle of repose of the solids and to reduce movement of material in the feed direction when the displaceable body segment is at rest;
   an actuator attached to the displaceable body segment and controllable to cause selected displacement of the body segment and attached actuator and corresponding selected flow of solid material within the displaceable body segment from a state of repose within the repose section in the feed direction.

2. The oscillatory feeder of claim 1, wherein the first fixable location of the displaceable body segment is positionable at a first elevation, and wherein the second fixable location of the displaceable body segment is positionable at a second elevation lower than the first elevation.

3. The oscillatory feeder of claim 1, wherein the first fixable location is offset in a horizontal direction from the second fixable location.

4. The oscillatory feeder of claim 1, wherein the displaceable body segment has a curved profile, wherein the curved profile has a length longer than a shortest distance separating the first fixable location and the second fixable location, and wherein the actuator is attached to the displaceable body segment approximately at an inflection point for a curve of the curved profile.

5. The oscillatory feeder of claim 1, wherein the first end comprises an end segment positionable in a generally upright orientation.

6. The oscillatory feeder of claim 1, wherein the second end comprises an end segment positionable in a generally upright orientation.

7. The oscillatory feeder of claim 1, wherein the actuator comprises a rotating offset mass, and wherein the rotating offset mass generates a force causing displacement of the displaceable body segment and the attached acutator.

8. The oscillatory feeder of claim 1, wherein the displacement is selected to cause the actuator to move in a closed trajectory having at least one of a vertical component and a horizontal component.

9. The oscillatory feeder of claim 1, wherein the repose section is configured to collect solid material of a leading edge of a flow of material received at the first end of the feeder.

10. The oscillatory feeder of claim 9, wherein the intermediate section is downstream of a first upright section and upstream of a second upright section, the first and second upright sections each extending in a generally vertical direction.

11. The oscillatory feeder of claim 1, wherein the repose section is configured for positioning when at rest at a slight angle relative to horizontal.

12. The oscillatory feeder of claim 1, wherein the tubular body is constructed of a resilient material.

13. The oscillatory feeder of claim 1, wherein the tubular body comprises polyurethane hose material.

14. An oscillatory feeder, comprising:
a tubular body having an inlet end, an outlet end opposite the inlet end and a displaceable body segment along a feeding direction between the inlet end and the outlet end;
the inlet end being configured for connection to a source of material to be fed by the feeder;
the outlet end being configured to convey flowable divided solids from the feeder to a location downstream of the feeder, wherein the outlet end is configured for positioning at a lower height than and horizontally offset from the inlet end;
the displaceable body segment being positionable when installed to have a length longer than a shortest distance between the inlet end and the outlet end and to define a curved profile with at least one inflection point;
the displaceable body segment when installed defining a repose section configured to support accumulated solids in the displaceable body segment at an angle of repose of the solids and to reduce movement of material in the feeding direction when the displaceable body segment is at rest; and
an actuator connected to the displaceable body segment and having an offset rotating mass, the actuator being controllable to displace the displaceable body segment in an oscillating cycle, the cycle including movement from an at rest position to convey solids in the repose section toward the outlet end, thereby creating a void in upstream accumulated solids, and to receive additional solids from the inlet end to fill the void.

15. The oscillatory feeder of claim 14, wherein the repose section at rest extends substantially laterally.

16. The oscillatory feeder of claim 14, wherein when the displaceable body segment is installed, the actuator extends from a lower side of the displaceable body segment.

17. The oscillatory feeder of claim 14, wherein the displaceable body segment extends substantially from the inlet end and substantially to the outlet end.

18. The oscillatory feeder of claim 14, wherein the repose section is caused to be displaced from a substantially lateral position at rest to tilt downwardly toward the outlet end cyclically.

19. The oscillatory feeder of claim 14, wherein the actuator is configured to move at a rate sufficient to cause displacement of the displaceable body section to urge the solids to move at a rate between a low trickle flow and a high bulk filling flow.

20. A method of conveying flowable solid material with an oscillatory feeder, comprising:
receiving solid material at a displaceable tubular body segment of the oscillatory feeder;
monitoring an amount of the solid material being conveyed with a sensor;
receiving signals from the sensor at a controller;
sending control signals from the controller to the oscillatory feeder to control displacement of the displaceable body segment and thereby control a flow rate of the solid material over a flow rate range ratio of greater than 1:50 of a low flow rate to a high flow rate.

21. The method of claim 20, wherein monitoring the amount of the solid material being conveyed comprises configuring the sensor to measure a loss of weight of the solid material from a source of the material positioned upstream of the feeder.

22. The method of claim 20, wherein monitoring the amount of the solid material being conveyed comprises configuring the sensor to measure a gain in weight from the solid material conveyed to a receptacle positioned downstream of the feeder.

23. The method of claim 20, wherein the flow rate range ratio is greater than 1:4000.

24. A method of conveying flowable polysilicon, comprising:
receiving flowable silicon from a source into a flexible tubular body of an oscillatory feeder;
controllably contorting the flexible tubular body through a cyclical trajectory having at least one of a horizontal component and a vertical component to convey the flowable silicon in a flow direction; and
receiving the flowable silicon in a receptacle positioned downstream of the feeder.

* * * * *